PATCHCORD CONNECTION AID AND CHECKING SYSTEM

Filed Oct. 15, 1959 6 Sheets-Sheet 1

INVENTORS
LAWRENCE P. FABER, JR.
RALPH A. POST, JR.
ROBERT FROHMAN
BY George A. Sullivan
Agent

INVENTORS
LAWRENCE P. FABER, JR.
RALPH A. POST, JR.
ROBERT FROHMAN

BY George C. Sullivan
Agent

INVENTORS
LAWRENCE P. FABER, JR.
RALPH A. POST, JR.
ROBERT FROHMAN
BY George C. Sullivan
Agent INVENTORS
LAWRENCE P. FABER, JR.
RALPH A. POST, JR.
ROBERT FROHMAN
BY
George C. Sullivan

PATCHCORD CONNECTION AID AND CHECKING SYSTEM

Filed Oct. 15, 1959

6 Sheets-Sheet 5

INVENTORS
LAWRENCE P. FABER, JR.
RALPH A. POST, JR.
ROBERT FROHMAN
BY
George Sullivan
Agent Sept. 4, 1962 R. FROHMAN ETAL 3,052,842

PATCHCORD CONNECTION AID AND CHECKING SYSTEM

Filed Oct. 15, 1959 6 Sheets-Sheet 6

INVENTORS
LAWRENCE P. FABER, JR.
RALPH A. POST, JR.
ROBERT FROHMAN
BY
George Sullivan United States Patent Office 3,052,842
Patented Sept. 4, 1962

3,052,842
PATCHCORD CONNECTION AID AND CHECKING SYSTEM

Robert Frohman and Ralph A. Post, Jr., Los Altos, and Lawrence P. Faber, Jr., Palo Alto, Calif., assignors to Lockheed Aircraft Corporation, Burbank, Calif.
Filed Oct. 15, 1959, Ser. No. 846,681
8 Claims. (Cl. 324—66)

This invention relates to improved means and methods for rapidly changing complex electrical circuits. More particularly, this invention relates to improved means and methods for rapidly and conveniently making and checking patchboard connections.

The need for changing complex electrical circuits has become more severe with the advent of computers, which require large numbers of circuits to be inter-connected in a variety of ways in order to program the computer and permit versatility of operation. For this reason, patchcord programming systems have been developed in which patchcords are provided which rapidly permit connection between contacts by means of a patchboard and contact board arrangement. Such a system is that provided by the patchcord equipment sold by A–MP Incorporated of Harrisburg, Pennsylvania. The A-MP programming systems basically comprise a metal frame assembly which rigidly mounts a permanent or fixed contact board. This contact board retains the contact springs, which in turn are connected to the internal wiring of the electronic equipment, such as a computer, whose circuits are to be changed. The frame also provides metal tracks for accepting a removable program patchboard to which patchcords are connected to create definite circuits. When the removable patchboard is fully engaged in the metal frame, the metal tips of the patchcords mate with the contact springs in the fixed contact board.

The above described A-MP patchcord programming system offers considerable advantages, in that it permits patchcord connections to be rapidly and conveniently made, and in addition, permits the patchboards with the patchcords mounted therein to be removed and stored for later use. However, the making of a considerable number of patchcord connections to this removable patchboard is very time-consuming, requiring the technician doing the job to perform the wiring using a wire list in order to determine where to connect the patchcords. Also, once the patchcords are made there is no simple method for determining whether the patchcords have been correctly connected except by again running down the wire list and checking each individual patchcord connection.

It is the object of this invention, therefore, to provide improved means and methods for rapidly making and checking patchboard connections.

Another object of this invention is to provide devices operating in conjunction with a patchboard programming system which permit the patchboard connections to be rapidly and conveniently made and checked.

A further object of this invention is to provide devices operating in conjunction with a patchcord programming system whereby each patchcord connection can be readily checked at the same time the patchcord connection is made to the patchboard.

A still further object of this invention is to provide a device operating in conjunction with a patchcord programming system which provides a light indication of the correct placement of each patchcord connection.

The above objects are accomplished in accordance with the present invention by employing programmed punched cards in conjunction with a light matrix assembly to visibly indicate to the technician the correct placement of each patchboard connection, and in conjunction with a plurality of transistors to check that the patchcord connections have been correctly made.

The specific nature of the invention, as well as other objects, uses and advantages thereof, will clearly appear from the following description and from the accompanying drawing in which.

In the drawing like numerals designate like elements through the figures.

Figure 1:
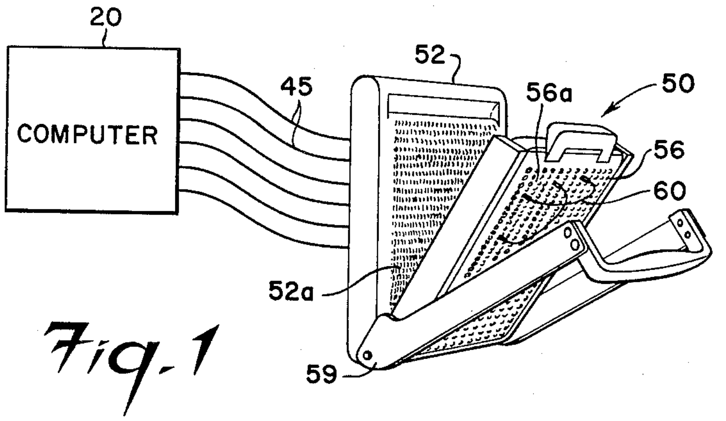
FIGURE 1 is a perspective and diagrammatic view of a type of commercially available patchcord programming system to which a computer is connected whose internal electrical circuits are to be changed.
Figure 3:
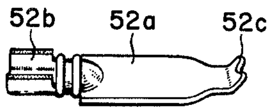
FIGURE 3 is a pictorial view illustrating a contact spring of a fixed contact board used in a conventional type of patchcord programming system.
Figure 2:
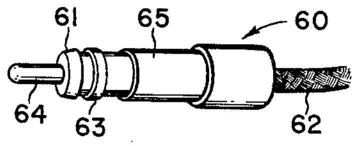
Fig. 2 PRIOR ART
FIGURE 2 is a pictorial view illustrating the plug of a typical patchcord.
Figure 4:
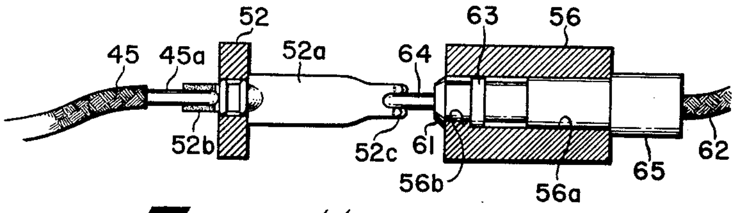
FIGURE 4 is a pictorial view, partially in cross-section, showing how a patchcord plug is connected to a contact spring in a conventional type of patchcord programming system.

FIGURES 1 through 4 illustrate a typical patchcord programming system 50 comprising a metal frame assembly 59 which rigidly mounts a permanent or fixed contact board 52. The fixed contact board 52 has a matrix of contact springs **52*a* which are connected to the internal wiring of electronic equipment such as a computer 20, whose electrical circuitry is to be changed, by means of wires 45 connected to contact spring terminals 52*b* at the rear of the fixed contact board 52. The frame assembly 59 also accepts a removable patchboard 56 having a matrix of patchcord connector receiving holes or openings 56*a* adapted to receive the plugs of the patchcords 60. When the patchboard 56 is fully engaged by the frame assembly 59, each metal tip 64 of a patchcord plug 65 mates with the end 52*c* of a contact spring 52*a* in the contact board 52, thereby creating definite circuits. An abutment 56*b* in the hole 56*a* firmly holds the patchcord lead 65 in place by means of the annular shoulders 61 and 63 on the patchcord lead 65. The opposite side of the contact spring 52*a* from the end 52*c*, which makes contact with the metal tip 65, is held in the fixed contact board 52, and has a terminal 52*b* projecting from the back side of the contact board 52. This terminal 52*b* is adapted to receive a pin 45***a* of a wire 45 connected to the internal wiring of the computer 20.

The patchboard programming equipment shown in FIGURES 1 through 4 and described above is commercially available (for example, from A–MP Incorporated) and the use thereof will be clearly understood by those skilled in the art. The main object of the present invention is to permit the very considerable number of patchcord connections required in these patchcord programming systems to be very much more rapidly and conveniently made and checked, thereby greatly reducing the preparatory time required in programming computers or in connecting other types of complex electrical equipment, when it is desirous to change their internal wiring.

For the purposes of this invention, and as will hereinafter become evident, it has been found highly desirable to consider the patchboard of the conventional patchcord programming system as consisting of two halves, for example, patchboard portions disposed on left and right sides of the patchboard. The fixed contact board is then wired to the internal wiring of the computer or electrical equipment so that all patchcords will be connected with one patchcord plug on the left side of the patchboard and the other patchcord plug in the right side of the patchboard. This division into two halves does not limit the versatility of the system, but may require a larger patchboard.

In describing the present invention means and methods will first be shown, whereby the necessary patchcord connections can be correctly and rapidly made without having to refer to the time-consuming wire list heretofore required, which frequently led to errors which were difficult and time-consuming to find.

Figure 5:
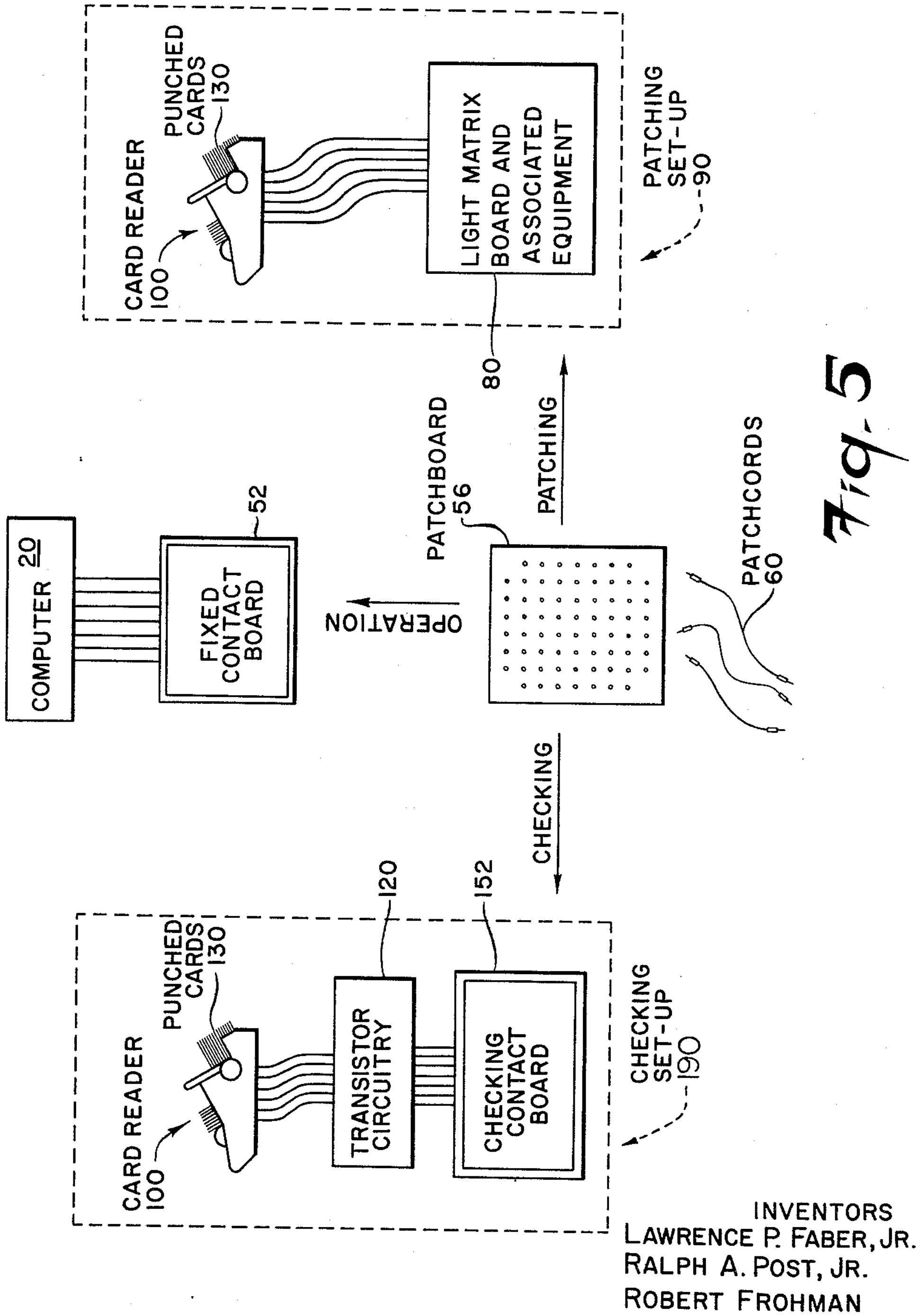
FIGURE 5 is a block diagram of an over-all embodiment of the invention illustrating the means and methods for rapidly making and checking patchcord connections, in accordance with the invention.

In accordance with the invention, and as broadly indicated in the patching set-up 90 shown in the right half of FIGURE 5, the system for rapidly and conveniently making these patchboard connections involves removing the patchboard 56 from the fixed contact board 52 and locating a matching light (or other electrically activated indicating means) matrix board 80 adjacent and in alignment with the patchboard 56 so that a light, if lit, will shine through its corresponding patchboard hole 56*a* and be visible to the technician making the patches. A plurality of programmed punched cards 130, one card for each patchcord connection, are used in conjunction with a card reader 100 to select which lights are to be lit to indicate the correct patchcord connection to be made. The circuitry for accomplishing this is shown in FIGURE 6, while a structural embodiment is shown in FIGURE 7.

Figure 7:
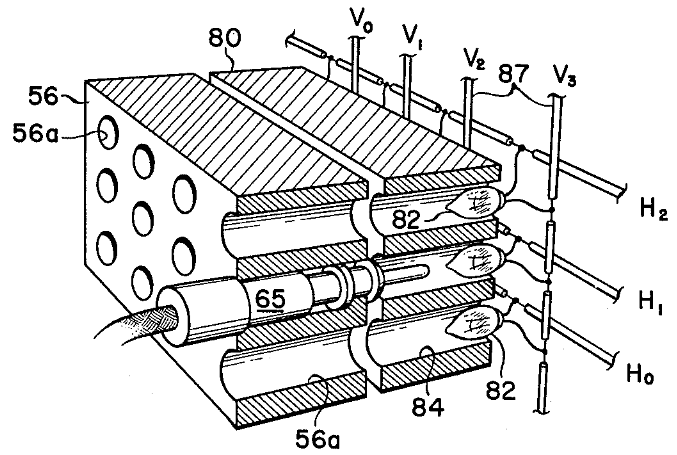
FIGURE 7 is a pictorial cross-sectional view of an embodiment of the invention showing a section of light matrix board disposed with respect to a corresponding section of patchboard to provide a visible indication of the correct placement of each patchcord connection, in accordance with the invention.

In FIGURE 7 a portion of a patchboard 56 is shown with a matching portion of the light matrix board 80 adjacent thereto so that holes 84 in the light matrix board 80 are in alignment with the patchboard holes 56*a*. A wire grid 87 is suitably mounted on the side of the light matrix board 80 opposite from the patchboard 56, and a matrix of light producing gas diodes, such as the neon bulbs 82, are electrically connected to the wire grid 87 with one bulb 82 being disposed in each hole 84. It can be seen that when a neon bulb 82 is lit will be visible through its corresponding patchboard hole 56*a* at the front of the patchboard 56 so as to enable a technician to make the correct patchcord connection. A patchcord plug 65 may then be connected in the lighted patchboard hole 56*a*, which effectively cuts off the light from the technician's view, indicating a correct connection. Although only portions of a patchboard 56 and a light matrix board 80 are shown, it is to be understood that the structural arrangement of FIGURE 7 can be extended through the structure.

Figure 6:
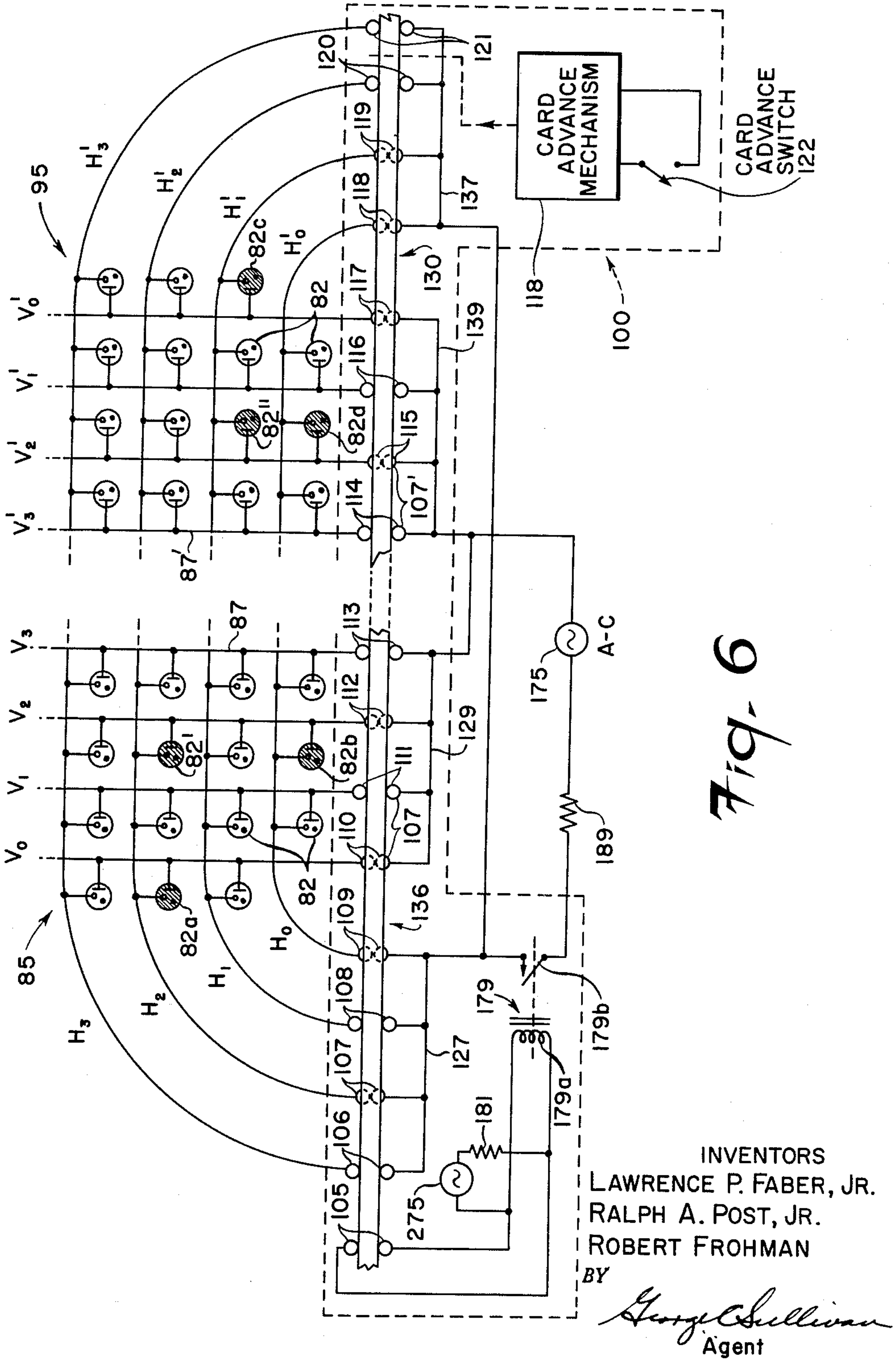
FIGURE 6 is a circuit and block diagram illustrating how the light matrix board and associated circuitry are connected to operate in conjunction with a card reader and programmed punched cards to provide a visible indication of the correct placement of each patchcord connection, in accordance with the invention.

In the circuit and block diagram of FIGURE 6, a card reader 100 employs a plurality of oppositely disposed pairs of metal contacts 105, 106, 107, 108, 109, 110, 111, 112, 113, 114, 115, 116, 117, 118, 119, 120 and 121. Programmed punched cards 130 (FIGURE 5) are caused to be interposed, one at a time, between these oppositely disposed metal contacts 105–121. When a punched card 130 is so disposed, it will be referred to as in the "read" position of the card reader 100. When the punched card 130 is in the "read" position, each pair of oppositely disposed metal contacts makes contact with one another only if the punched card 130 has a hole at the location of the particular pair of oppositely disposed metal contacts. The punched card 130 when in the "read" position, essentially acts as a switch which determines which pairs of oppositely disposed metal contacts 105–121 are to be connected together for a given punched card 130. In FIGURE 6, for example, the punched card 130 has holes located at the pairs of metal contacts 107, 109, 110, 112, 115, 117, 118 and 119, thereby permitting the oppositely disposed metal contacts of each pair to touch and make contact.

It is to be understood that card readers, such as 100 shown in FIGURES 5 and 6, having metal contacts between which a plurality of programmed punched cards 130 may be interposed, one at a time, are well known in the art. Also, means for punching programmed cards are well known and can readily be applied to the punched cards 130 of this invention. Likewise, control mechanisms associated with card readers for providing various mechanical and positioning operations on the punched cards 130 are within the skill of those in the art. For example, such mechanisms can be found on card readers made by a number of companies in the computer field. For the purposes of the present invention, these control mechanisms are generally indicated by the card advance mechanism 118 shown in FIGURE 6. The card advance switch 122 may readily be constructed and arranged in conjunction with this card advance mechanism 118 so that the momentary closing thereof advances the next punched card to the "read" position. The switch 122 is preferably a foot-switch which leaves the technician's hands free to handle the patchcords.

Because of the availability of punch card control mechanisms and punching means, it is believed sufficient for the present invention merely to describe how a single illustrative punched card 130, interposed between the card reader metal elements 105–121, operates to select which bulbs on the light matrix board 80 are to be lit. It is to be kept in mind that the main purpose of the card reader 100 and the programmed cards 130 is to select the neon bulbs 82 which are to be lit to provide a visible indication to the technician of each patchcord connection to be made. It is the energizing of the appropriate wire grid elements to provide the desired selection which is the important requirement for the purposes of this invention, and other methods for energizing the appropriate wire grid elements may be utilized. The novel card reader and programmed punched card arrangement illustrated in FIGURE 6, however, offers important advantages in speed and convenience which greatly increase the value of this invention.

In order to more clearly describe the invention and prevent confusion, FIGURE 6 is drawn to show the circuitry required for only relatively small portions of the light matrix board 80. It is to be understood that the wiring of these portions is followed throughout the total light matrix. The numeral 85 designates the lower left portion of the light matrix board 80 and the numeral 87 designates the wire grid corresponding thereto, while the numeral 95 designates the lower right portion of the light matrix board 80 and the numeral 87′ designates the wire grid corresponding thereto. Only those portions of the punched card 130 and those pairs of metal contacts 105–121 required for these portions 85 and 95 are shown. It will be understood that the arrangement of these pairs of metal contacts 105–121 on the punched card 130 can be changed as desired, and instead of the linear arrangement shown may be arranged in columns or in any other suitable way.

The neon bulbs 82 are connected to the wire grids 87 and 87′ and are located to light corresponding holes 56a of the patchboard 56. For the right and left portions 85 and 95, each neon bulb 82 is connected so that one of its leads is connected to a corresponding horizontal grid wire, while its other lead is connected to a corresponding vertical grid wire, forming the matrix arrangement shown in FIGURE 6. For the left side 85, horizontal wires of the grid 87, starting from the bottom of the matrix board 80, are designated $H_0$, $H_1$, $H_2$, $H_3$, etc., and the vertical grid wires starting from the left of the matrix board 80 are designated $V_0$, $V_1$, $V_2$, $V_3$, etc. Similarly, for the right side 95, $H_0'$, $H_1'$, $H_2'$, $H_3'$, and $V_0'$, $V_1'$, $V_2'$, $V_3'$, etc., designate horizontal and vertical grid wires of the wire grid 87′ starting from the bottom and right sides, respectively, of the light matrix board 80.

The horizontal and vertical grid wires of both halves of the light matrix board 80 are each connected to the upper contact of one pair of metal contacts 105–121 of the card reader 100, as shown in FIGURE 6. For example, horizontal grid wire $H_3$ is connected to the upper metal contact of the pair 106, the horizontal grid wire $H_2$ is connected to the upper contact of the pair 107, and so on. The lower contacts of the pairs of contacts 105–121 are connected so that those contact pairs whose upper contacts are connected to horizontal grid wires have their lower contacts all connected together, as shown at 127 and 137; while those contact pairs whose upper contacts are connected to vertical grid wires have their lower contacts all connected together, as shown at 129 and 139. The lower contacts whose upper contacts are connected to horizontal grid wires are connected through the normally open contact 179b of a relay 179 and a load resistor 189 to one side on an A.C. power source 175, while the lower contacts whose upper contacts are connected to vertical grid wires are connected to the other side of the A.C. power source 175.

The pair of contacts 105 are used with the relay 179 to prevent power from being applied to the wire grid 187 when no card 130 is in the "read" position at which time the upper and lower contacts may touch one another. Energization power from the source 275 is applied to the coil 179a of the relay 179 through the resistor 181, the pair of contacts being wired across the coil 179a. If, when no card 130 is in the "read" position the upper and lower contacts of the pairs of contacts 105–121 touch, the pair 105 will short out the relay contact 179a, causing the relay contact 179b to open and disconnect the power source 175. When a card 130 is interposed, the relay coil 179a will be unshorted, permitting the relay 179 to energize, causing the relay contact 179b to reconnect the power source 175. The resistor 181 prevents shorting of the source 275 when the relay coil 179a is shorted by the pair of contacts 105.

For the circuit arrangement shown in FIGURE 6 it will now be understood that when a card 130 is in the "read" position and appropriate pairs of metal contacts are caused to touch as a result of holes in the punched card 130, the A.C. voltage of the source 175 will appear across corresponding horizontal and vertical grid wires. The full A.C. voltage of the source 175 will thus be caused to be applied only to those neon bulbs 82 whose leads are connected to vertical and horizontal wires across which the source voltage is applied as a result of these grid wires being connected to those pairs of metal contacts which are made to touch by holes in the punched card 130. The A.C. voltage of the source 175 is chosen so that it will cause breakdown and light a neon bulb 82 when the full voltage appears directly across the bulb, and will be insufficient to break down two neon bulbs connected in series, whether one of them is conducting or not. Such a choice of the voltage of the source 175 assures that the neon bulbs 82 which are lit are determined solely by the holes in the punched card 130. For the particular punched car 130 illustrated in FIGURE 6, it will be seen that six of the neon bulbs 82 will light, these being 82a, 82b, 82c, 82d, 82′ and 82″, as indicated by their being cross-hatched. The lit bulbs 82′ and 82″ indicate the patchboard holes in the left and right sides, respectively, of the patchboard to which the patchcord plugs are to be connected. The edge bulbs 82a, 82b, 82c and 82d are lighted to act as coordinates to help the technician locate the patchboard holes corresponding to the lit bulbs 82′ and 82″ between which the patch is to be made. Ths will be of considerable help where many patchcords have already been connected in the patchboard.

For this system, therefore, each programmed punched card 130 is punched so that it will cause the appropriate six bulbs to light corresponding to the particular patchcord connection to be made, one card being used for each patchcord; two coordinate edge lights and the desired patchboard hole will be lit on the left side of the board, and two coordinate edge lights and the desired patchboard hole will be lit on the right side of the patchboard. When it is desired to advance the card reader to bring the next card 130 to the "read" position, the card advance switch 122 is closed, activating the card advance mechanism 118. When the complete set of punched cards have been run through the card reader with the technician making each patchboard connection in accordance with the visible light indication appearing on the patchboard, the patchboard will be completely wired for its intended purpose. It has been found that this can be done in less than one-tenth the time heretofore required to make the same patchcord connections.

Once the patchcord connections have been made in the patchboard it would be desirable to be able to rapidly check the accuracy of these connections, regardless of what means were used for patching. In accordance with the present invention, such means and method for rapidly checking the accuracy of the patchcord connections have been devised, as generally outlined in the checking setup 190 shown in FIGURE 5. In the checking setup 190, a checking contact board 152 and metal frame assembly (not shown) is provided which may be identical to that of the fixed contact board 52 and metal frame assembly 59 shown in FIGURE 1. The contact springs of the checking contact board 152 are wired to transistor circuitry 120, which operates in conjunction with a card reader 100 and the punched cards 130, used in the patching setup 90, to make it possible to automatically and rapidly check the accuracy of the patchcord connections when the patchboard 56 is engaged on the checking contact board 152.

Figure 8:
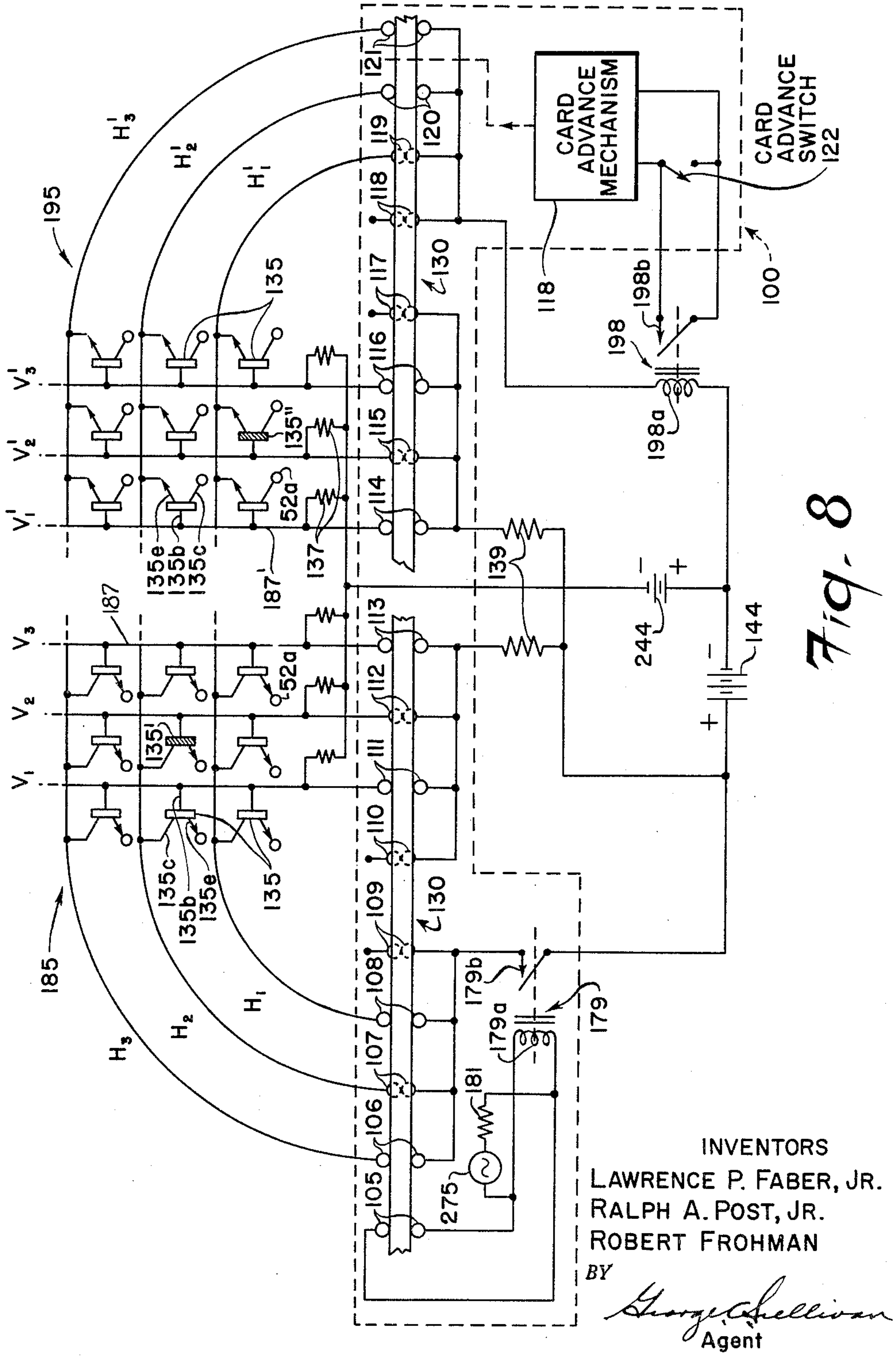
FIGURE 8 is a circuit and block diagram showing how transistor circuitry is connected in conjunction with a card reader and programmed punched cards to provide automatic checking of the patchcord connections, in accordance with the invention.
Figure 9:
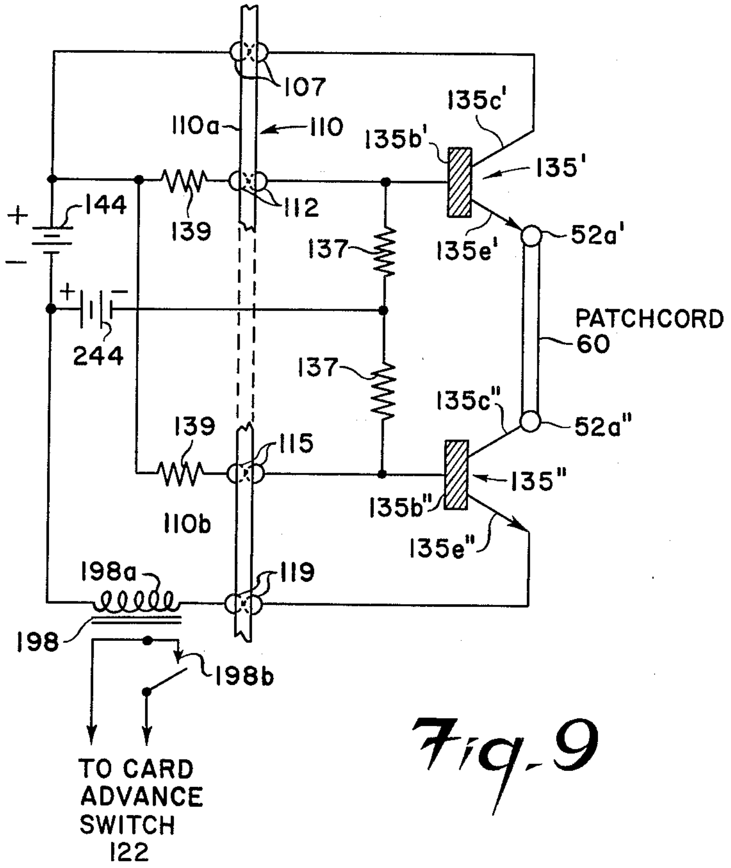
FIGURE 9 is a circuit diagram illustrating the operation of the transistor checking circuitry shown in FIGURE 8.

The transistor circuitry 120 operating in conjunction with the card reader 100 and the punched cards 130 for automatically and rapidly checking the accuracy of the patchcord connections is shown in FIGURES 8 and 9. No physical construction of the transistor circuitry 120 is shown, since any of a variety of well known chassis connection arrangements may be employed for this purpose. Basically, however, a plurality of NPN transistors 135 are connected in an electrical wiring matrix indicated at 187 and 187′ and operates with the card reader 100 and the punched cards 130 in much the same way as did the light matrix previously described. The wiring arrangements 187 and 187′ for the two halves 185 and 195 are physically shown in matrix form in FIGURE 8, but it is to be understood that this is done only for convenience of explanation and any physical arrangement may be employed which gives the illustrated electrical matrix.

In FIGURE 8, a transistor 135 is provided for each patchboard hole. The transistor matrix corresponding to the lower left portion of the patchboard is designated by the numeral 185, while the transistor matrix corresponding to the lower right portion of the patchboard is designated by the numeral 195. The portions 185 and 195 of the transistor circuitry 120 respectively correspond to the same portions 85 and 95 of the light matrix board 80, and as with the light matrix board, are followed throughout the transistor circuitry. Each transistor 135 in the lower left portion 185 has its base **135*b* connected to a vertical wire of the electrical wiring matrix 187, its collector 135*c* connected to a corresponding horizontal wire, and its emitter 135*e* connected to the contact spring 52*a* of the checking contact board 152 corresponding to the patchboard hole of the particular transistor. The transistors 135 for the lower right side portion 195 of the patchboard also have their bases 135*b* connected to vertical grid wires of the corresponding electrical wiring matrix 187′, but have their emitter 135*e* and collector 135*c* connections reversed from that of the lower left side portion 185, so that the emitter 135*e* is connected to a horizontal grid wire, while the collector 135*c* is connected to the contact spring 52*a* of the checking contact board 152** corresponding to the patchboard hole of the particular transistor.

The card reader 100 of FIGURE 8 whose pairs of contacts 105–121 operate in conjunction with the transistors 135 in the electrical wiring matrix 187 and the cards 130 may be the same as that shown in the FIGURE 6 light matrix circuitry. The horizontal wires $H_1$, $H_2$, $H_3$, $H_1'$, $H_2'$ and $H_3'$, and the vertical wires $V_1$, $V_2$, $V_3$, $V_1'$, $V_2'$ and $V_3'$ of the electrical wiring arrangements 187 and 187′ correspond to the same designated wires in the FIGURE 6 circuit and are similarly connected to the upper contacts of the pairs of contacts 105–121 of the card reader 100. It is to be noted that the $V_0$, $V_0'$, $H_0$, and $H_0'$ wires connected to the edge neon bulbs have been omitted in FIGURE 8, since they are not needed in the transistor circuit arrangement. The pairs of contacts 109, 110, 117 and 118 are thus not required in this embodiment and will be ignored in the description following.

It can be seen from FIGURE 8 that a D.-C. voltage source designated by the battery 144 has its positive side connected to the lower contacts of the pairs of contacts 106, 107 and 108, and its negative side connected to the lower contacts of the pairs of contacts 119, 120 and 121. Also, the positive side of the battery 144 is connected through a resistor 139 to the lower contacts of the pairs of contacts 111, 112 and 113, and through another resistor 139 to the lower contacts of the pairs of contacts 114, 115 and 116. A negative cut-off bias is applied to the bases **135*b* of the transistors 135 by means of a battery 244 having its positive side connected to the negative side of the battery 144 and its negative side connected to the transistor bases 135*b* through the base resistors 137, each base resistor 137 being connected between the negative side of the battery 244 and a vertical wire $V_1$, $V_2$, $V_3$, $V_1'$, $V_2'$ or $V_3'$ as shown. It should be noted that the pair of contacts 105 of the card reader 100 operate with the relay 179, the source 275 and the resistor 181 to open the lead to the battery 144 in the same manner as was done with the source 175** in FIGURE 6.

From the above discussion it will now be evident that the holes in the punched card 130, which cause the pairs of contacts 107, 112, 115 and 119 to touch, result in only one transistor 135′ in the left portion 185 having both a positive voltage applied to its collector **135*c*′ and a positive voltage applied to its base 135*b*′, and only one transistor 135″ in the right portion 195 having both a negative voltage applied to its emitter 135*e*″ and a positive voltage applied to its base 135*b*″. Since the punched card 130 used for FIGURES 6 and 8 is the same, these transistors 135′ and 135″, which are shown cross-hatched, correspond to the same patchboard holes as did the neon bulbs 82′ and 82″ which were lit in the light matrix board 80** of FIGURE 6.

In order to better understand the resultant effect of the application of these voltages to the transistors 135′ and 135″, the circuit of FIGURE 9 is included showing only the transistors 135′ and 135″ and the pertinent associated circuitry of FIGURE 8. In FIGURE 9 it can be seen that if there is a patchcord 60 connecting the contact springs **52*a*′ and 52*a*″ to which the emitter 135*e*′ and the collector 135*c* are respectively connected, the transistors 135′ and 135″ will effectively be connected in series so as to place the battery 144 in series with the coil 198*a* of the relay 198. The resistors 137 and 139 are chosen in conjunction with the magnitude of the batteries 144 and 244 and the relay 198, so that the transistors 135′ and 135″ are turned "on" from their initially cut-off condition, causing the battery 144 to send an energizing current through the coil 198*a* of the relay 198. Thus, if a patchcord 60 is connected between the contact springs 52*a*′ and 52*a*″ the relay 198 will be energized, closing its normally open contact 198*b* and thereby closing the card advance switch 122, which causes the card advance mechanism 118 to bring the next card 130 into the "read" position, during which time the relay 198 de-energizes. If a patchcord is connected between the contact terminals connected to the transistors selected by this card, the relay 198 will then be energized again in the same manner as just described, and the next punched card 130 will be brought to the "read" position. Thus, the card advance mechanism 118 of the card reader 100 will continue to advance the cards 130 automatically as long as the patchcord connections of the patchboard have been correctly made, but will stop at the punched card 130 corresponding to an incorrect patchcord connection, since if no patchcord connection is present for a particular card, the circuit to the relay coil 198*a* will remain open. The technician then need only note the card 130 at which the card reader stopped, and manually advance the card reader 100 to the next card by closing the card advance switch 122**. After the check is completed, the technician can then correct the wrong patchcord connections and re-run for a final check.

In connection with the transistor circuitry shown in FIGURES 8 and 9 it is to be understood that the invention is not limited to the specific circuitry illustrated and a number of modifications are possible. For example, NPN transistors could be used instead of PNP transistors, or the circuit could be designed to operate with one NPN and one PNP transistor. Also, the particular biasing arrangement shown may be accomplished in a variety of other ways which will be evident to those skilled in the art.

It is also to be understood that the checking embodiment shown in FIGURES 8 and 9 can be used to check the correctness of connections between any types of terminals, in addition to its novel use for checking patchcord connections of a patchboard as described for the illustrative embodiment. Such terminals may be temporarily connected, or even permanently connected, and will still be amenable to checking by the circuitry shown in FIGURES 8 and 9.

Figure 10:
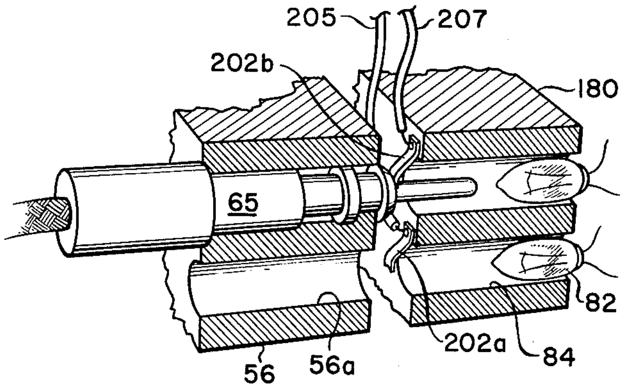
FIGURE 10 is a cross-sectional view of another embodiment of the invention by means of which the patchcord connection is checked at the same time the patchcord is connected to the patchboard.

A further extension of the present invention involves an embodiment as shown in FIGURE 10, whereby the checking operation may be performed at the same time the patchcord connection is made. This may be accomplished by using a combination light matrix and checking contact board 180 adjacent and in alignment with the patchboard 56. This board 180 is constructed so that the neon bulbs 82 can be seen through the patchboard holes **56*a* for patching purposes, and at the same time permits the checking transistor circuitry to be connected to the patchcord pins for checking purposes. In the illustrative embodiment of FIGURE 10 a spring-type terminal, such as indicated at 202*a* and 202*b*, is provided for each patchboard hole 56*a* with a wire, such as indicated at 205 and 207, connected to the transistor circuitry 120 in the same manner as were the contact springs 52*a* in the circuitry shown in FIGURES 8 and 9. A patchcord plug 65 is shown in one of the holes 56*a* of the patchboard 56 to illustrate how its pin 64 makes contact with the spring-type terminal 202*b***.

For the combined embodiment of FIGURE 10, it will be evident that it is necessary to have means for selecting both the neon bulbs and the transistors, in order to provide a visual indication for patching and a check of the patchcord connection at the same time. This can be most directly accomplished by the use of filters to separate the A.-C. voltages applied to the light matrix from the D.-C. voltages applied to the transistor matrix. Alternatively, the card reader 100 and the punched cards 130 could be provided with sufficient pairs of contacts and punched holes to permit independent connection of the light matrix and transistor matrix, so that both selections can be made in a single operation when a punched card is in the "read" position. The circuits of FIGURES 6 and 8 can then be directly used with their respective pairs of contacts in such an embodiment, the only difference in operation being that the technician need not depress the card advance switch 122 to advance the card reader 100, this being taken care of by the energization of the relay 198 in FIGURE 8 in response to a correct patchcord connection.

Other combinations of the light matrix and transistor circuitry are possible with the FIGURE 10 embodiment, such as by using two "read" positions, one for the light matrix circuitry and the other for the transistor circuitry. In such an arrangement, the punched card could be positioned in a first "read" position to provide a visual indication for patching, and in a second "read" position to check whether the patchcord connection is correct.

It will be apparent to those skilled in the art that various changes and modifications can be made in the circuitry and structural embodiments described and shown in the drawing, and the invention is not to be considered limited to any particular embodiment. For example, although the embodiments contemplate that only one patchcord connection will be made or checked for each punched card, those skilled in the art will readily be able, in accordance with the present invention, to provide that one or more independent or mutually dependent patchcord connections be made and checked by each punched card. It is to be understood, therefore, that the embodiments illustrated in the drawing are only exemplary, and that various modifications can be made in construction and arrangement within the scope of the invention, as defined in the appended claims.

We claim as our invention:

1. In combination with a patchboard having patchcord receiving holes and a plurality of patchcords connected in said holes such that all the patchcords have one plug in a hole in the left side of the patchboard and the other plug in the right side of the patchboard, means for checking the accuracy of the patchcord connections made in said patchboard comprising a plurality of transistors, each of a first number of said plurality of transistors corresponding to a patchcord receiving hole on the left side of the patchboard and each of a second number of said plurality of transistors corresponding to a patchcord receiving hole on the right side of the patchboard, each of said transistors having a base, an emitter and a collector, means adapted to connect the emitter of each of said first number of transistors to the plug of a patchcord when the patchcord is connected in a hole corresponding to that transistor, means adapted to connect the collector of each of said second number of transistors to the plug of a patchcord when the patchcord is connected in a hole corresponding to that transistor, each patchcord connection thereby connecting the collector of one of said first number of transistors to the emitter of one of said second number of transistors, a plurality of programmed punched cards, a card reader having a plurality of oppositely disposed pairs of metal contacts between which each of said plurality of punched cards is interposed in sequence, each of said pairs of contacts being adapted to touch and make contact when a card interposed therebetween has a hole at that location, a power source, means connecting the collectors and bases of said first number of transistors and the emitter and bases of said second number of transistors to said pairs of metal contacts and said power source so that as the punched cards are sequentially interposed between said pairs of contacts the transistors corresponding to correct patchcord connections for each punched card as determined by the punched holes therein are turned "on" from an initial cut-off condition, and means cooperating with said card reader and programmed punched cards for advancing the card reader to interpose the next card between said pairs of metal contacts in response to the presence of a correct patchcord connection.

2. In combination with a patchcord programming system comprising a fixed contact board having contact springs connected to electronic equipment whose internal wiring is to be changed, a removable patchboard having patchcord receiving holes, a plurality of patchcords, and means for engaging the patchboard with the fixed contact board so that patchcords in the patchcord receiving holes make contact with corresponding contact springs in the fixed contact board, the improvement comprising a light matrix assembly to which said patchboard can be mounted, said light matrix assembly having a plurality of lights arranged to be in substantial alignment with a plurality of patchcord receiving holes when said patchboard is mounted thereto so that when a light is lit the light produced thereby will be visible at the front of the patchboard through its corresponding patchcord receiving hole, a plurality of terminals one for each hole, each terminal being adapted to make connection with the patchcord inserted in its corresponding patchcord receiving hole, a plurality of transistors, each transistor corresponding to one of said patchcord receiving holes, means connecting at least one of the elements of each of said transistors to a corresponding terminal, each patchcord connection thereby connecting the elements of two transistors, a power source, a card reader and programmed punched cards operating in cooperation with said light matrix assembly and said plurality of transistors so that for each punched card said power source selects those lights of the light matrix which are to be lit in order to indicate the patchcord receiving holes between which a patchcord is to be connected, and so that for each punched card said power source also applies signals to selected transistors whose elements should properly be connected by patchcord connections, and means cooperating with said card reader to advance the programmed punched cards in response to the presence of a patchcord connection between the selected transistors.

3. In combination with a patchcord programming system comprising a fixed contact board having contact springs connected to electronic equipment whose internal wiring is to be changed, a removable patchboard having patchcord receiving holes, a plurality of patchcords, and means for engaging the patchboard with the fixed contact board so that patchcords in the patchcord receiving holes make contact with corresponding contact springs in the fixed contact board, the improvement comprising a programmed card reader, means cooperating with said card reader for sequentially lighting patchcord receiving holes to indicate those patchcord receiving holes between which patchcord connections are to be made, and means also cooperating with said card reader for checking the accuracy of each patchcord connection as it is made and advancing said card reader in response thereto.

4. In combination with a patchcord programming system comprising a fixed contact board having contact springs connected to electronic equipment whose internal wiring is to be changed, a removable patchboard having patchcord receiving holes, a plurality of patchcords, and means for engaging the patchboard with the fixed contact board so that patchcords in the patchcord receiving holes make contact with corresponding contact springs in the fixed contact board, the improvement comprising a light matrix assembly to which said patchboard can be mounted, said light matrix assembly having a plurality of lights arranged to be in substantial alignment with a plurality of patchcord receiving holes when said patchboard is mounted thereto so that when a light is lit the light produced thereby with be visible at the front of the patchboard through its corresponding patchcord receiving hole, a plurality of terminals corresponding to patchcord receiving holes, each terminal making connection with a patchcord inserted in its corresponding patchcord receiving hole, at least one transistor operatively connected to each terminal, a programmed card reader, means operating in cooperation with said light matrix assembly for sequentially lighting selected lights of said light matrix assembly in order to indicate the patchcord receiving holes between which patchcords are to be connected, means also cooperating with said card reader for sequentially applying electrical signals to selected transistors corresponding to those terminals between which electrical connections should properly be present, and means cooperating with said last mentioned means for indicating the presence of an electrical connection between terminals whose corresponding transistors have been selected.

5. In a patchboard programming system of the class wherein a patchboard containing a multitude of connector receiving openings for receiving a multitude of patchcords according to a predetermined schedule is aligned upon and electrically connected to a contact board having direct electrical connection to the internal circuitry of an electronic device whereby said electronic device can be programmed according to said predetermined schedule, the combination with said patchboard an aligning light matrix board for attachment to the side opposite the patchcords whereby individual lights of said matrix board are energized according to a predetermined schedule to project light into the correspondingly aligned connector receiving openings for facilitating accurate manual insertion of patchcords into the lighted patchboard receiving openings thereby programming same according to said predetermined schedule and a checking contact board for electrically connecting to said patchboard whereby said patchboard so patched is checked to reveal deviations in following the predetermined schedule in order that said deviations may be corrected before actual connection of the patchboard to the contact board of said electronic device.

6. In a patchboard programming system of the class wherein a patchboard containing a multitude of connector receiving openings for receiving a multitude of patchcords according to a predetermined schedule is aligned upon and electrically connected to a contact board having direct electrical connection to the internal circuitry of an electronic device whereby said electronic device can be programmed according to a predetermined schedule, the combination with said patchboard an aligning light matrix board for attachment to the side opposite the patchcords whereby individual lights of said matrix board are energized according to a predetermined schedule to project light into the correspondingly aligned connector receiving openings for facilitating accurate manual insertion of patchcords into the lighted patchboard receiving openings thereby programming same according to said predetermined schedule, means for energizing said lights according to said predetermined schedule, and a checking contact board for electrically connecting to said patchboard whereby said patchboard so patched is checked to reveal deviations in following the predetermined schedule in order that said deviations may be corrected before actual connection of the patchboard to the contact board of said electronic device.

7. In a patchboard programming system of the class wherein a patchboard containing a multitude of connector receiving openings, for receiving a multitude of patchcords according to a predetermined schedule is aligned upon and electrically connected to a contact board having direct electrical connection to the internal circuitry of an electronic device whereby said electronic device can be programmed according to said predetermined schedule, the combination with said patchboard an aligning matrix board for attachment to the side opposite the patchcords whereby individual lights of said matrix board are energized according to a predetermined schedule to project light into the correspondingly aligned connector receiving openings for facilitating accurate manual insertion of patchcords into the lighted patchboard receiving openings thereby programming same according to said predetermined schedule, means for energizing said lights according to said predetermined schedule, a checking contact board for electrically connecting to said patchboard and means for applying electrical signals to said checking contact board and means responsive to said electrical signal for indicating proper connection of patchcords according to said predetermined schedule, whereby said patchboard so patched is checked to reveal deviations in the attempt to follow the predetermined schedule in order that said deviations may be corrected before actual connection of the patchboard to the contact board of said electronic device.

8. In a patchboard programming system of the class wherein a patchboard containing a multitude of connector receiving openings for receiving a multitude of patchcords according to a predetermined schedule is aligned upon and electrically connected to a contact board having direct electrical connection to the internal circuitry of an electronic device whereby said electronic device can be programmed according to said predetermined schedule, the combination with said patchboard an aligning matrix board containing a multitude of electrically actuated indicating means for attachment to said patchboard whereby the individual electrically actuated indicating means of said matrix board are energized according to a predetermined schedule to provide sensible indications in the correspondingly aligned connector receiving openings for facilitating accurate insertion of patchcords into said patchboard receiving openings thereby programming same according to said predetermined schedule, means for energizing said electrically actuated indicating means according to said predetermined schedule, a checking contact board for electrically connecting to said patchboard, means for applying electrical signals to said checking contact board, and means responsive to said electrical signal for indicating proper connection of patchcords according to said predetermined schedule, whereby said patchboard so patched is checked to reveal deviations in the attempt to follow the predetermined schedule in order that said deviations may be connected before actual connection of the patchboard to the contact board of said electronic device.

References Cited in the file of this patent

UNITED STATES PATENTS

| | | |
|---|---|---|
| 763,404 | Kaisling | June 28, 1904 |
| 2,637,096 | Luhn | May 5, 1953 |
| 2,977,530 | Cook | Mar. 28, 1961 |
| 2,997,646 | Voegtlen | Aug. 22, 1961 |